United States Patent
Corbin et al.

(10) Patent No.: US 6,676,378 B2
(45) Date of Patent: Jan. 13, 2004

(54) TURBOMACHINE STATOR FLAP, AND A METHOD OF MANUFACTURING IT

(75) Inventors: Claude-Gaston Corbin, Voisenon (FR); Jean-Marie Le Francois, Bordeaux (FR); Cyrille Mathias, Livry-Gargan (FR)

(73) Assignee: SNECMA Moteurs, Paris (FR)

( * ) Notice: Subject to any disclaimer, the term of this patent is extended or adjusted under 35 U.S.C. 154(b) by 72 days.

(21) Appl. No.: 10/006,129

(22) Filed: Dec. 10, 2001

(65) Prior Publication Data

US 2002/0071766 A1 Jun. 13, 2002

(30) Foreign Application Priority Data

Dec. 12, 2000 (FR) .............................. 00 16123

(51) Int. Cl.$^7$ ................................ F01D 17/16
(52) U.S. Cl. ............ 416/160; 416/224; 415/200; 415/191; 29/889; 29/0.21
(58) Field of Search .............. 416/160, 224, 416/226, 250, 241 A, 241 R; 415/200, 191, 159, 160, 208.2; 29/889.12, 889.2, 889.21, 889.6, 889.61, 889.7, 889.71, 889.72

(56) References Cited

U.S. PATENT DOCUMENTS

| | | | |
|---|---|---|---|
| 4,022,540 A | | 5/1977 | Young |
| 4,180,371 A | * | 12/1979 | Ivanko ........................ 415/115 |
| 4,273,601 A | | 6/1981 | Weingart |
| 5,085,559 A | * | 2/1992 | Stoffer et al. .................. 416/95 |
| 5,226,789 A | * | 7/1993 | Donges ....................... 415/189 |
| 5,380,152 A | * | 1/1995 | Sikorski et al. ............. 415/160 |
| 5,392,514 A | | 2/1995 | Cook et al. |
| 5,598,760 A | | 2/1997 | Sucic et al. |
| 5,605,441 A | * | 2/1997 | Boszor et al. ............... 415/200 |
| 5,690,469 A | * | 11/1997 | Deal et al. ................... 415/189 |
| 5,791,879 A | * | 8/1998 | Fitzgerald et al. ....... 416/229 A |
| 6,139,278 A | * | 10/2000 | Mowbray et al. ........ 416/229 A |
| 6,196,794 B1 | * | 3/2001 | Matsumoto ................. 415/191 |

* cited by examiner

Primary Examiner—Edward K. Look
Assistant Examiner—J. M. McAleenan
(74) Attorney, Agent, or Firm—Oblon, Spivak, McClelland, Maier & Neustadt, P.C.

(57) ABSTRACT

A turbomachine stator flap including a structural beam which is formed integrally with a structural core for a vane, and fastening portions, and a composite envelope surrounding the structural core and forming at least the aerodynamic profile of the vane.

47 Claims, 4 Drawing Sheets

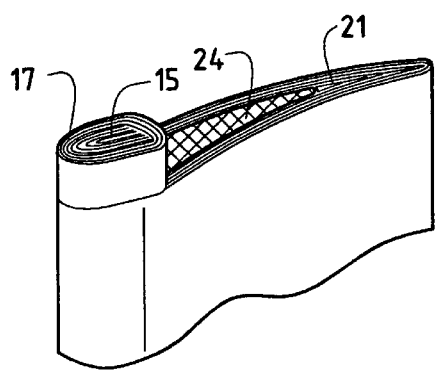
FIG.4A
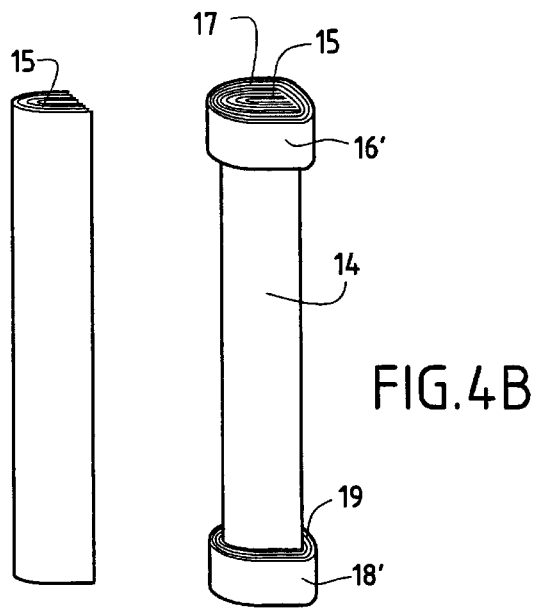
FIG.4B
FIG.5
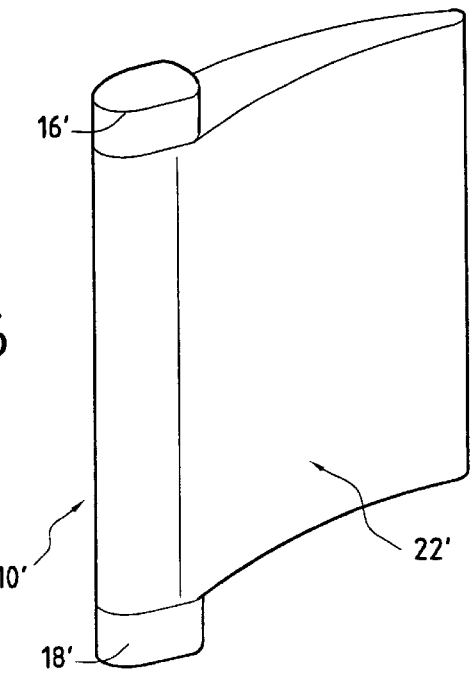
FIG.6

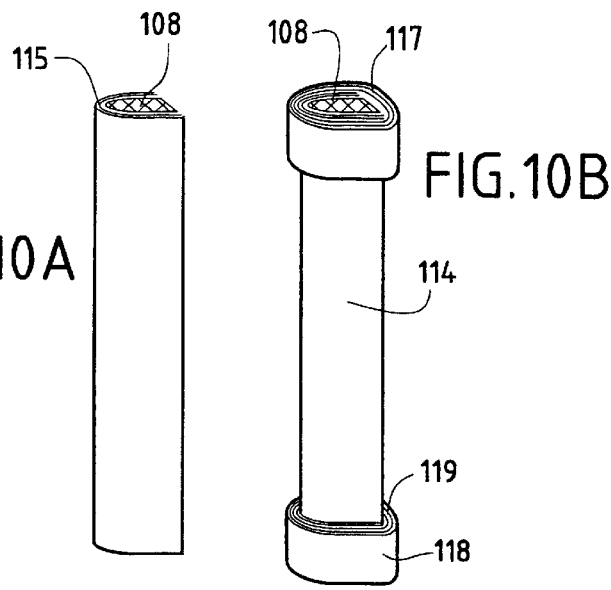
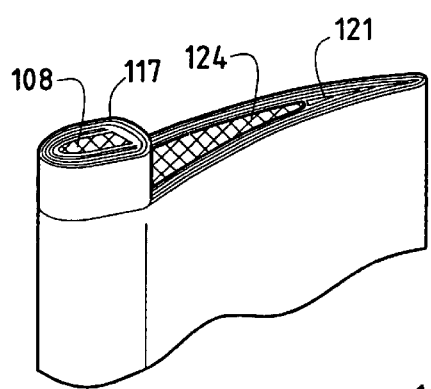
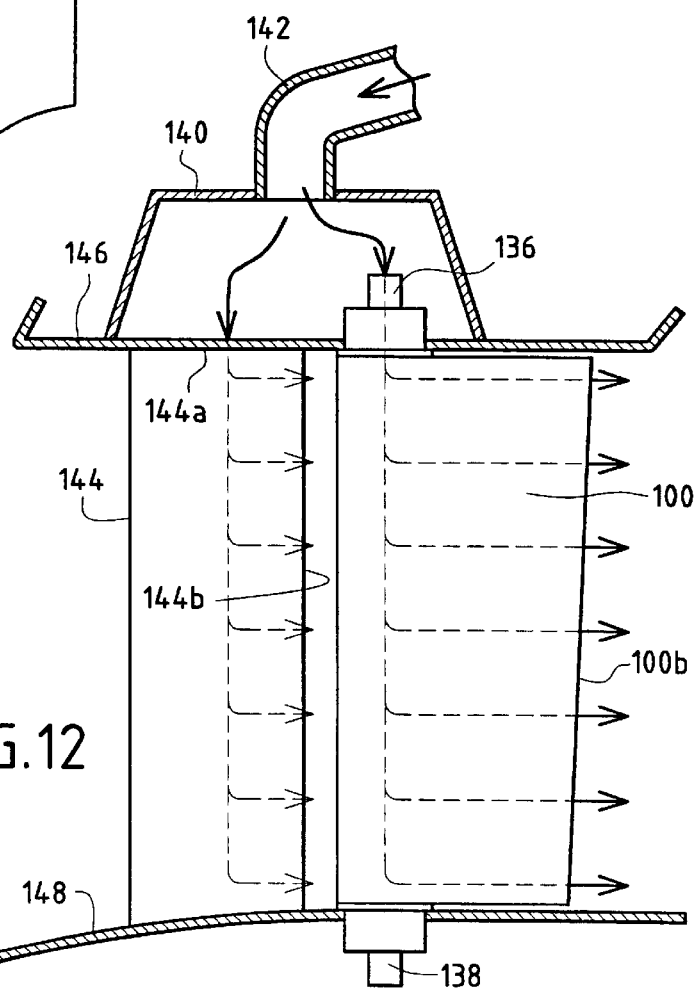

TURBOMACHINE STATOR FLAP, AND A METHOD OF MANUFACTURING IT

BACKGROUND OF THE INVENTION

The invention relates to making stator flaps for a turbomachine, in particular to making flaps having a variable setting angle, and to installing them in a turbojet inlet casing.

In conventional manner, stator flaps comprise a vane-forming portion of aerodynamic profile which is provided at two opposite ends with fastening pieces which, for flaps of variable setting angle, form pivots in radial alignment.

It is known that vanes can be made of composite material by shaped draping of plies of fiber reinforcement. The draping can be performed on a piece constituting a former. The plies are impregnated with resin before or after draping. After polymerization enabling the resin to harden, a blank is obtained of a shape that is close to that of the vane that is to be made. The blank is then machined to its final dimensions.

Compared with a metal vane, a vane made of composite material provides a significant saving in weight while conserving very good mechanical behavior. Nevertheless, a problem which arises is making the connection with the fastening portions. The known solution which consists in localized draping of the vane reinforcing plies around metal fastening portions can be unsatisfactory, with the connection being made fragile by the forces to which the vane is subject being concentrated since they need to be taken up by the fastening portions.

OBJECTS AND SUMMARY OF THE INVENTION

An object of the invention is to propose an architecture for a turbomachine stator flap that makes it possible in particular to resolve the above-mentioned problem of transmitting forces to the fastening portions.

According to the invention, this object is achieved by a stator flap including a structural beam comprising a structural core for the vane and formed integrally with at least a fraction of the fastening portions, the structural core being surrounded by a composite envelope forming at least the aerodynamic profile of the blade.

The invention is remarkable in particular for separating the structural function which is provided by the structural beam and the aerodynamic function which is provided by the vane envelope. The structural continuity between the vane core and the fastening portions ensures that the forces applied to the vane are transmitted directly without any risk of delamination between the vane and the fastening portions.

The structural beam is advantageously made of a composite material. It could be made of metal.

According to a feature of the stator flap of the invention, at least one of the fastening portions is provided with a metal band which, when said fastening portion constitutes a pivot, is prevented from rotating relative to the fastening portion about the pivot axis.

According to another feature of the stator flap, it has internal passages opening out firstly at one end of at least one fastening portion and secondly along at least one of the edges of the vane.

Such stator flaps provided with internal passages can advantageously be installed in a turbomachine inlet casing surrounded by a defrosting manifold, the attachment portions into which the internal passages of the flaps open out then being implanted in the inlet casing in the defrosting manifold so as to cause it to communicate with said internal passages.

The invention also seeks to provide a method of making a stator flap as defined above. According to the invention, such a method comprises the steps consisting in:

making a structural beam comprising a structural core of the vane formed integrally at least with structural cores of the fastening portions; and draping fiber reinforcement plies around the structural beam so as to make a composite envelope surrounding the structural core of the vane and forming at least the aerodynamic profile of the vane.

BRIEF DESCRIPTION OF THE DRAWINGS

The invention will be better understood on reading the following description given by way of non-limiting indication and made with reference to the accompanying drawings, in which:

FIGS. 4A and 4B show two steps in the manufacture of the structural beam of composite material in the flap of FIGS. 1 to 3;

FIG. 5 is a fragmentary view showing how the vane envelope of the flap of FIGS. 1 to 3 is made;

FIG. 6 is a diagrammatic view of a vane blank as obtained by implementing the method shown in FIGS. 4A, 4B, and 5;

FIGS. 10A and 10B are section views showing two steps in making the structural beam of composite material for the flap of FIG. 9;

FIG. 11 shows how the vane envelope of the FIG. 9 flap is made; and

FIG. 12 is a highly diagrammatic view showing how a flap of the kind shown in FIG. 9 is installed in a turbomachine inlet facing.

DETAILED DESCRIPTION OF EMBODIMENTS

Figure 1:
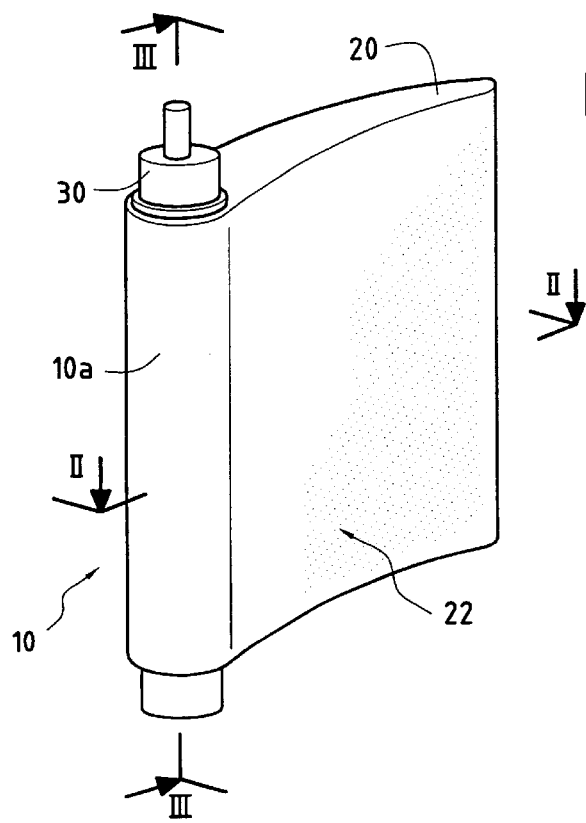
FIG. 1 is a diagrammatic view of a stator flap of the kind that can be made in accordance with the invention.
Figure 2:
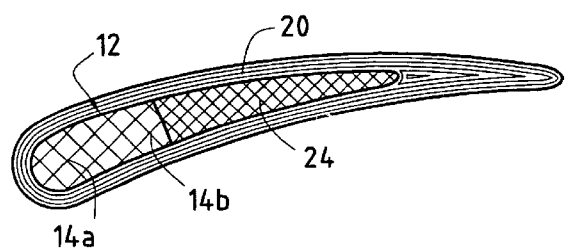
FIG. 2 is a section view on plane II—II of FIG. 1.
Figure 3:
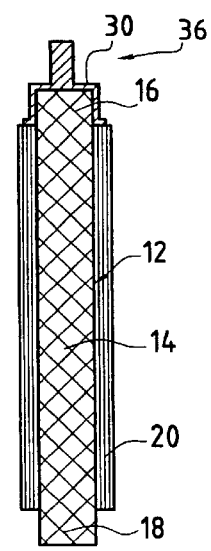
FIG. 3 is a section view on plane III—III of FIG. 1.

FIGS. 1 to 3 show a stator flap 10 made in accordance with the invention. In the example shown, this is a turbomachine stator flap of variable setting angle. Nevertheless, the invention is not limited to turbomachine stator flaps of this type.

The flap 10 essentially comprises a structural beam 12 extending over the full height of the flap and comprising a structural core 14 for the vane formed integrally with fastening portions 16, 18 at opposite ends of the structural core.

A metal band 30 is engaged on the fastening portion 16 that is to be connected to a control link for controlling the angular position of the flap. A metal band can also be engaged on the other fastening portion 18.

An envelope 20 surrounds the structural core 14 of the vane and forms the aerodynamic profile of the vane 22 of the flap.

In the embodiment shown, the structural beam extends along one of the edges 10a of the flap. In other embodiments of flaps, the structural beam could extend in the middle portion of the flap.

Still in the embodiment shown, the structural core 14 of the vane comprises a portion 14a which extends in line with the fastening portions 16 and 18, and a portion 14b which extends from the portion 14a over a limited distance inside the aerodynamic profile of the vane.

A former 24 extends the portion 14b, the assembly formed by the core 14 and the former 24 being surrounded by the envelope 20 which is of substantially constant thickness.

In a variant, the portion 14b could be extended so as to occupy the volume occupied by the former 24.

In another variant, the former 24 could be replaced by a cavity.

The structural beam 12 could be made of metal. Nevertheless, it is preferably made of composite material, for example as shown in FIGS. 4A and 4B.

The structural core of the vane is made by draping fiber reinforcing plies 15, e.g. plies of carbon fiber cloth impregnated with a resin such as an organic resin. The plies 15 extend over the full height of the structural beam, including the fastening portions.

Additional plies 17 are added to form a blank 16' of the fastening portion 16 at one end of the structural beam, and other additional plies 19 are added to form a blank 18' for the fastening portion 18 at the other end. The plies 17 and 19 are preferably of the same kind as the plies 15. They are draped onto the plies 15 at the ends which project beyond the location of the structural core of the vane.

Heat treatment is performed to polymerize the resin impregnating the plies 15, 17, and 19.

In a variant, it is possible to use dry fiber reinforcement plies, with the plies being impregnated with a resin after they have been draped, e.g. by injecting resin into a mold, in well-known manner.

The envelope 20 of the vane is formed by draping fiber reinforcing plies 21 around the structural core 14 extended by the former 24 (FIG. 5).

By way of example, the plies 21 can be made of carbon fiber cloth impregnated with an organic resin.

The carbon fibers making up the plies 21 can optionally be identical to the fibers making up the plies 15, 17, and 19. Insofar as the envelope 20 does not perform the same structural function as the beam 12, the carbon fibers constituting the plies 21 can be fibers having a large Young's modulus, while the fibers constituting the plies 15, 17, and 19 can be fibers having high mechanical strength.

Heat treatment is performed to polymerize the resin impregnating the plies 21.

The same heat treatment can be performed to polymerize simultaneously the resin impregnating the plies 21 and the resin impregnating the plies 15, 17, and 19.

The plies 21 could be draped in the dry state, with resin impregnation being performed after draping, e.g. by injecting resin into a mold. Insofar as the same resin is used for impregnating the plies 15, 17, 19, and 21, all of the plies could be draped while dry, prior to all of the plies being impregnated simultaneously.

At least some of the plies 21 can extend over the full height of the structural beam, with the end portions of the plies being draped around the blanks 16' and 18' for the fastening portions, which then form kinds of cores for the fastening portions.

This provides a flap blank 10' (FIG. 6) having a vane blank 22' formed by the draped plies 21 and blanks 16' and 18' for the fastening portions.

The flap 10 is obtained by machining the blank 10'. The metal band 30 is then put into place on the fastening portion 16, e.g. by being shrunk on. The precision with which the flap is set in position is then unaffected by thermal expansion of the composite material of the fastening portion 16 since it always remains held tight inside the band 30.

In order to prevent any relative rotation between the band 30 and the fastening portion 16 forming a pivot 36 of the flap, locking can be provided against rotation between the band 30 and the attachment portion 16 about the pivot axis.

Figure 7:
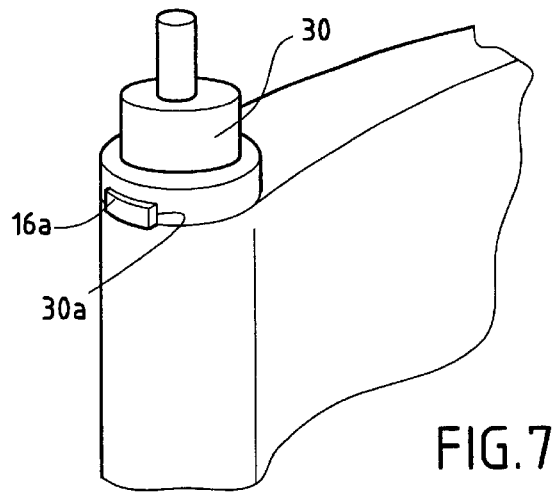
FIGS. 7 and 8 show two variant ways of mounting a metal band on a fastening portion of a flap obtained by machining the blank of FIG. 6.

Such locking against rotation can be achieved by forming one or more notches or cutouts 30a in the base of the band 30 and causing projections 16a machined on the fastening portion 16 to be received therein (FIG. 7).

Figure 8:
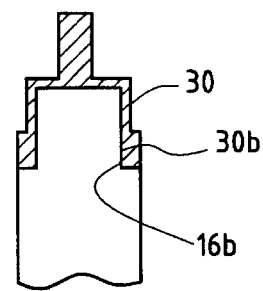

In another embodiment, one or more flats 16b are formed on the edge of the fastening portion 16, with flats 30b formed on the inside face of the band 30 being pressed thereagainst (FIG. 8).

A metal band can also be mounted on the fastening portion 18 that forms the pivot 38 of the flap.

Figure 9:
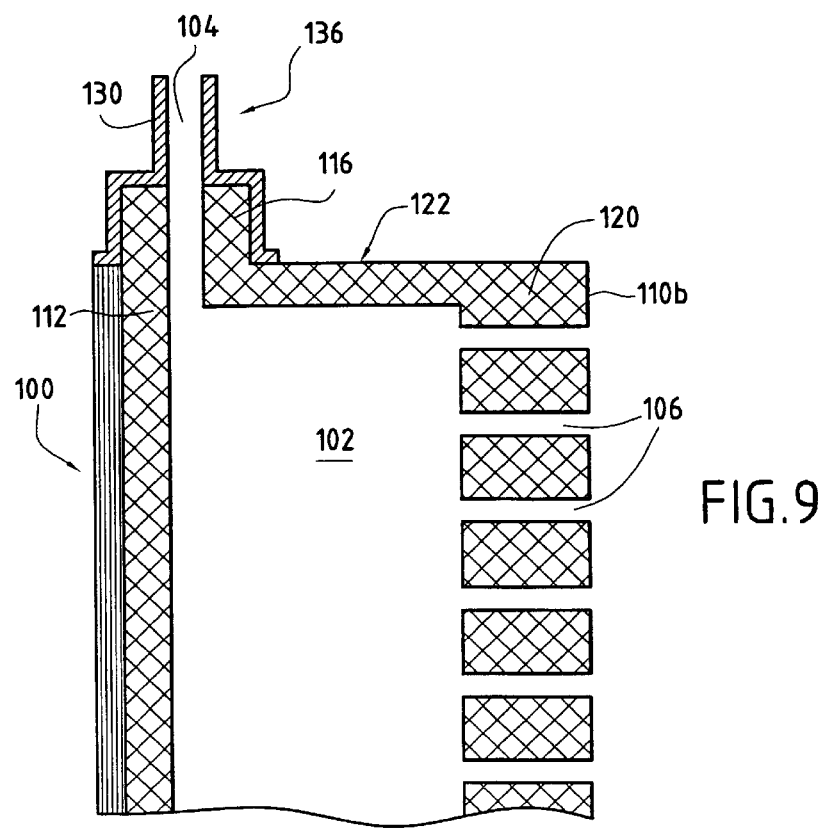
FIG. 9 is a diagrammatic section view showing a variant embodiment of a stator flap of the kind that can be made in accordance with the invention.

FIG. 9 shows another embodiment of a turbomachine stator flap 100 which differs from that of FIG. 2 in that it has an internal cavity 102 in communication with a longitudinal passage 104 formed inside the structural beam 112 and opening out through the end of the fastening portion 116. The passage 104 is extended through the metal band 130 which, together with the fastening portion 116, forms a pivot 136 having an axial passage.

Part of the cavity 102 extends inside the structural core 114 of the vane 122, and part of it extends inside the aerodynamic profile of the vane 122.

The cavity 102 also communicates with the outside through passages 106 that extend substantially perpendicularly to the beam 112 and that open out in the edge 110b of the flap, specifically in the trailing edge.

When the flap 100 is a flap whose setting angle in the inlet stator of a turbojet can be varied, the internal passages 104, 102, and 106 enable a hot defrosting gas to flow therethrough.

The structural beam 112 of the flap 100 (FIGS. 10A and 10B) is made in a manner that differs from the flap 10 in that the fiber reinforcing plies 115 of the structural core of the vane and the fiber reinforcing plies 117 of the fastening portion 116 are draped around a former 108. The former 108 has the shape of the portion of the cavity 102 that is situated inside the structural core 114 and the passage 104. Additional plies 119 are draped to form the fastening portion 118, as described for the flap 10.

The composite envelope 120 of the vane portion 122 is formed by draping plies 121 around the structural core of the vane 114 together with a former 124 whose shape corresponds to the shape of the portion of the cavity 102 situated in the aerodynamic profile of the vane (FIG. 11). The fiber reinforcing plies of the structural beam 112 and of the envelope 122, and the resin(s) impregnating the plies are similar to those described above with reference to the flap 10.

The formers 108 and 124 are made of a material that can easily be eliminated by melting or by dissolution so as to obtain the cavity 102 and the passage 104 after the flap blank has been made.

The passages 106 can be obtained by machining during the final stage of machining the flap 100 from the blank.

FIG. 12 is highly diagrammatic and shows a turbojet inlet casing having flaps 100 such as the flap shown in FIG. 9 installed therein to form an inlet stator (only one flap 100 is shown in FIG. 12).

A manifold 140 of annular shape surrounds the outer portion of the casing 146 and via a pipe 142 it receives a hot gas for defrosting purposes, e.g. air heated by the engine.

The flap 100 is mounted in such a manner that the end of the pivot 136 opens into the inside of the manifold 140. As a result, the hot air flows inside the flap 100, through the passage 104, the cavity 102, and the passages 106 before being ejected via the trailing edge 100b.

The other fastening portion of the flap 100, optionally fitted with a metal band, forms a pivot 138 housed in the inner portion 148 of the casing.

Arms 144 (only one is shown in FIG. 12) extend between the inner and outer portions 146 and 148 of the casing. In conventional manner, the arms 144 are hollow and present internal passages which open out respectively in an end 144a connected to the outer casing portion 146 and through orifices formed along the trailing edge 144b.

The arms 144 have their ends 144a connected to the defrosting manifold 140 so that hot defrosting air travels along the arms and is ejected through their trailing edges which are located immediately upstream from the locations of the flaps 100.

What is claimed is:

1. A turbomachine stator flap comprising:
    a vane-forming portion of aerodynamic profile made at least in part out of a composite material and provided at two opposite ends with fastening portions;
    a structural beam comprising a structural vane core and formed integrally with at least a part of the fastening portions;
    a composite envelope surrounding the structural core and forming at least the aerodynamic profile of the vane; and
    internal passages opening out firstly at one end in at least one of the fastening portions and secondly along at least one of the edges of the vane.

2. A stator flap according to claim 1, wherein the structural beam is made of composite material.

3. A stator flap according to claim 1, wherein at least one of the fastening portions is provided with a metal band.

4. A stator flap according to claim 1, wherein the fastening portion fitted with the metal band constitutes a pivot, the metal band being prevented from rotating relative to the fastening portion about the pivot axis.

5. The stator flap according to claim 1, further comprising a form for supporting said composite envelope formed therearound.

6. The stator flap according to claim 1, wherein said composite envelope defines a void within the stator flap.

7. A turbomachine comprising:
    a set of stator flaps installed in an inlet casing surrounded by a defrosting manifold, wherein the stator flaps comprise:
        a vane-forming portion of aerodynamic profile made at least in part out of a composite material and provided at two opposite ends with fastening portions;
        a structural beam comprising a structural vane core and formed integrally with at least a part of the fastening portions;
        a composite envelope surrounding the structural core and forming at least the aerodynamic profile of the vane; and
        internal passages opening out firstly at one end in at least one of the fastening portions and secondly along at least one of the edges of the vane,
    and the fastening portions into which the internal passages of the flaps open out are received in the inlet casing via the defrosting manifold so as to cause it to communicate with said internal passages.

8. A method of manufacturing a turbomachine stator flap comprising a vane-forming portion of aerodynamic profile made at least in part out of composite material and fitted at two opposite ends with fastening portions, said method comprising:
    making a discrete structural beam having a width dimension that extends only partly along an aerodynamic chord of the stator flap, the structural beam being integrally formed at least with structural cores of the fastening portions; and
    draping fiber reinforcement plies around the structural beam so as to make a composite envelope surrounding the structural core of the vane and forming at least the aerodynamic profile of the vane.

9. A method according to claim 8, wherein the structural beam is made of a composite material by shaped draping fiber reinforcing plies.

10. The method according to claim 9, wherein the making the discrete structural beam comprises stacking a plurality of fiber reinforcing plies and folding the plurality once along an axial direction.

11. The method according to claim 10, further comprising wrapping a plurality of secondary fiber reinforcing plies about an end of the folded plurality of fiber reinforcing plies to define a fastening portion for the stator flap.

12. The method according to claim 11, further comprising attaching a metal band about the wrapped plurality of secondary fiber reinforcing plies.

13. The method according to claim 12, further comprising preventing relative rotation of the metal band and the secondary fiber reinforcing plies.

14. A method according to claim 8, wherein fiber reinforcing plies are draped around the assembly constituted by the structural core of the vane and a former of the vane, in order to form a vane envelope.

15. The method according to claim 8, wherein the making the discrete structural beam comprises draping fiber reinforcing plies around a former made from a sacrificial material.

16. The method according to claim 15, wherein fiber reinforcing plies are draped around the assembly constituted by the structural core of the vane and a former of the vane to form a vane envelope, wherein the former of the vane is made from a sacrificial material.

17. The method according to claim 16, further comprising sacrificing the former of the structural beam and the former of the vane to define a space within the stator flap.

18. The method according to claim 17, wherein the sacrificial material from which at least one of the former of the structural beam and the former of the vane is made is a meltable material.

19. The method according to claim 17, wherein the sacrificial material from which at least one of the former of the structural beam and the former of the vane is made is a dissolvable material.

20. The method according to claim 8, wherein the structural beam is located at an intermediate location along the aerodynamic chord of the stator flap between leading and trailing edges thereof.

21. A stator flap having an aerodynamic cross-sectional profile including a chord comprising:
    an elongate discrete structural beam extending in a direction generally perpendicular to the cross-sectional profile and having a width dimension extending along only a part of the chord; and
    a composite material envelope surrounding said structural beam and defining at least a part of the aerodynamic profile.

22. The stator flap according to claim 21, further comprising a form located within said composite material envelope, said form being constructed and arranged to at least partly define the aerodynamic cross-sectional profile of the stator flap.

23. The stator flap according to claim 21, wherein said composite material envelope includes a void within said composite material envelope.

24. The stator flap according to claim 23, wherein said void is in communication with an exterior of the composite material by passages defined in at least one of said fastening portions and in an edge of said composite material envelope.

25. The stator flap according to claim 21, wherein said structural beam is made from a composite material.

26. The stator flap according to claim 25, wherein said structural beam is made from a plurality of stacked composite fiber plies.

27. The stator flap according to claim 26, wherein said plurality of stacked composite fiber plies are folded once along a lengthwise direction to define said structural beam.

28. The stator flap according to claim 21, wherein said structural beam includes at least one fastening portion formed on an end thereof by which the stator flap is mounted.

29. The stator flap according to claim 28, wherein said at least one fastening portion includes a metal band fastened therearound.

30. The stator flap according to claim 29, wherein said at least one fastening portion includes means for preventing rotation of said metal band relative to the end of said structural beam.

31. The stator flap according to claim 28, wherein said at least one fastening portion comprises a plurality of composite material fabric plies wrapped about the end of said structural beam.

32. The stator flap according to claim 21, wherein said structural beam is located along an aerodynamic leading edge of the stator flap.

33. The stator flap according to claim 21, wherein said structural beam is located at an intermediate point along the chord.

34. A method of making a stator flap comprising:
    forming a discrete structural beam for the stator flap; and
    forming a composite material envelope around the structural beam to define an aerodynamic profile for the stator flap, wherein the structural beam is located along a chord of the aerodynamic profile, and wherein the discrete structural beam has a width dimension extending along only part of the chord.

35. The method according to claim 34, wherein, in forming the composite material envelope, the structural beam is located at an intermediate location along the chord.

36. The method according to claim 34, wherein forming the discrete structural beam comprises folding a stacked plurality of fiber reinforcing plies along an axial direction of the structural beam.

37. The method according to claim 36, wherein forming the discrete structural beam further comprises wrapping secondary fiber reinforcing plies about at least one end of the folded stacked plurality of fiber reinforcing plies to define a fastening portion for the stator flap.

38. The method according to claim 37, further comprising attaching a metal band around the secondary fiber reinforcing plies.

39. The method according to claim 34, wherein forming the composite material envelope comprises providing a form in addition to the discrete structural beam and at least partially defining the aerodynamic profile of the stator flap, about which a plurality of fiber reinforcing plies are draped.

40. The method according to claim 34, wherein forming the discrete structural beam comprises draping a plurality of fiber reinforcing plies about a structural beam form made from a sacrificial material.

41. The method according to claim 40, wherein forming the composite material envelope comprises providing an envelope form at least partially defining the aerodynamic profile of the stator flap, about which a plurality of fiber reinforcing plies are draped, the envelope form being made from a sacrificial material.

42. The method according to claim 41, wherein the sacrificial material of the structural beam form and the envelope form is either dissolvable or meltable.

43. The method according to claim 41, further comprising a form sacrificing to remove the envelope form and the structural beam form, thereby defining an interior space within the composite material envelope and the structural beam, respectively.

44. The method according to claim 43, further comprising providing passages between the interior space of the composite material and the structural beam and an exterior of the stator flap.

45. A stator assembly in a turbomachine including generally concentric inner and outer casing portions, the stator assembly comprising:
    a stator blade extending radially between said inner and outer casing portions, and being mounted at fastening portions thereof, wherein said stator blade comprises a discrete composite material structural beam extending in generally a same direction as a direction of extension, and a composite material envelope defining an aerodynamic profile of said stator blade surrounding said structural beam; and
    a pressure manifold surrounding said outer casing portion and including a gas inlet,
    wherein said stator blade has a space formed therein, a passage communicating with said space formed in one said fastening portion, and a plurality of passages communicating with said space formed in a trailing edge of said stator blade, said passage formed in said fastening portion being in fluid communication with said pressure manifold.

46. The assembly according to claim 45, further comprising a hollow arm located aerodynamically upstream from said stator blade with respect to said inner and outer casing portions, said hollow arm extending radially between said inner and outer casing portions and having an open end in communication with said pressure manifold and a plurality of openings formed in a trailing edge thereof.

47. The assembly according to claim 45, wherein said gas inlet is a heated gas inlet, whereby heated gas is forced through said passage formed in said fastening portion and out of said passages formed in said trailing edge of said stator blade.

* * * * *